United States Patent [19]

Blanchard

[11] 3,819,554

[45] June 25, 1974

[54] READILY PROCESSABLE ESSENTIALLY RIGID VINYL CHLORIDE POLYMER COMPOSITIONS

[75] Inventor: Robert R. Blanchard, Port Allen, La.

[73] Assignee: The Dow Chemical Company, Midland, Mich.

[22] Filed: Aug. 6, 1973

[21] Appl. No.: 386,244

Related U.S. Application Data

[63] Continuation of Ser. No. 162,681, July 14, 1971, abandoned, which is a continuation-in-part of Ser. No. 824,320, May 13, 1969, abandoned, which is a continuation-in-part of Ser. No. 684,938, Nov. 22, 1967, abandoned, which is a continuation-in-part of Ser. No. 373,086, June 5, 1964, abandoned.

[52] U.S. Cl...... 260/28.5 D, 260/876 R, 260/897 C
[51] Int. Cl..... C08f 45/52, C08f 19/18, C08f 29/18
[58] Field of Search.......... 260/28.5 R, 28.5 D, 896, 260/997 C, 876

[56] References Cited
UNITED STATES PATENTS

| | | | |
|---|---|---|---|
| 2,802,809 | 8/1957 | Hayes | 260/891 |
| 3,085,082 | 4/1963 | Baer et al. | 260/876 |
| 3,165,560 | 1/1965 | Frey et al. | 260/897 C |
| 3,291,863 | 12/1966 | Frey et al. | 260/897 C |
| 3,309,426 | 3/1967 | Hunyar | 260/897 C |

FOREIGN PATENTS OR APPLICATIONS

| | | | |
|---|---|---|---|
| 571,090 | 2/1959 | Canada | 260/897 |
| 626,534 | 8/1961 | Canada | 260/897 |
| 665,013 | 12/1965 | Belgium | 260/28.5 D |

Primary Examiner—Morris Liebman
Assistant Examiner—S. L. Fox
Attorney, Agent, or Firm—Ronald G. Brookens

[57] ABSTRACT

This invention pertains to essentially rigid vinyl chloride polymer compositions which are easily fabricated into articles such as extrusion blown bottles having exceptional clarity and surface smoothness. More particularly, the invention relates to rigid or essentially rigid thermoplastic compositions comprised essentially of 100 parts by weight of a vinyl chloride polymer in intimate admixture with between about 0.25 and 35 parts by weight of certain chlorinated polyethylenes and between about 0.2 and 0.7 part per 100 parts of a polyethylene having an average molecular weight of between about 1,500 and 15,000.

3 Claims, No Drawings

READILY PROCESSABLE ESSENTIALLY RIGID VINYL CHLORIDE POLYMER COMPOSITIONS

CROSS-REFERENCE TO RELATED APPLICATION

This application is a continuation of application Ser. No. 162,681, filed Jluy 14, 1971 (now abandoned), which in turn is a continuation-in-part of copending application Ser. No. 824,320, filed May 13, 1969, now abandoned which is in turn a continuation-in-part of application Ser. No. 684,938, filed Nov. 22, 1967 (now abandoned), which is in turn a continuation-in-part of application Ser. No.373,086, filed June 5, 1964 (now abandoned).

It is known to prepare shaped articles from blends of vinyl chloride polymers and chlorinated olefin polymers (U.S. Pat. No. 3,165,560 and Canadian Pat. No. 626,534) thereby obtaining the beneficial properties of each material, e.g., high tensile strength from the vinyl chloride polymer and enhanced flexibility from the chlorinated olefin polymer.

It is also known to incorporate low molecular weight polyethylenes, i.e., polyethylene waxes, into vinyl chloride polymers as processing aids and/or lubricants (U.S. Pat. No. 3,309,426 and Canadian Pat. No. 571,090). These prior known vinyl chloride polymer compositions, although having enhanced processability, i.e., increased rate of extrusion and like, have failed to provide for the fabrication of shaped articles e.g., extrusion-blown bottles, having the necessary clarity and surface smoothness, to be acceptable as a replacement for conventional glass bottles or other glass containers.

It has now been discovered, which discovery forms the present invention, that the addition to vinyl chloride polymers of the hereinafter specified mixtures of certain chlorinated olefin polymers and polyethylenes unexpectedly provide for the fabrication of shaped articles having the necessary clarity and smoothness of surface.

Such results are believed to be due to the interaction of the prescribed chlorinated ethylene polymers and the polyethylene constituents of the claimed compositions wherein the chlorinated ethylene polymer ingredient serves to enhance the compatibility of the polyethylene to the vinylchloride polymer present in the formulation to the point where such polyethylene is capable of a controlled migration to the articles being fabricated. In this regard, it is critical that such migration be to an extent required to essentially eliminate undesirable adhesion of the composition to the metallic surfaces of the fabricating equipment but not to the extent of over lubricating such surface with the formation of shaped articles having irregular or "lumpy" surface characteristics.

More specifically, the compositions of the present invention are comprised essentially of:

1. A vinyl chloride polymer containing at least about 95 weight percent of polymerized vinyl chloride in the polymer molecule with the remainder being at least one monoethylenically unsaturated comonomer, and preferably the homopolymer of vinyl chloride;
2. Between about 0.25 and 35 parts by weight per 100 parts of the vinyl chloride polymer of a chlorinated olefin polymer prepared by the chlorination of an olefin polymer having an essentially linear structure, said olefin polymer being selected from the group consisting of polyethylene and interpolymers composed of at least 90 mole percent ethylene with the remainder being one or more ethylenically unsaturated comonomers; the chlorinated olefin polymers having a molecular weight of at least about 20,000 and preferably between about 20,000 and 300,000 and containing from about 35 to 48 weight percent of chemically combined chlorine and having a crystallinity of less than about 10 percent when containing about 34 or more weight percent of chlorine, and;
3. Between about 0.2 and 0.7 part per 100 parts of the vinyl chloride polymers of a polyethylene having an average molecular weight of between about 1,500 and 15,000.

The vinyl chloride polymer included in the polymer blends may be any rigid or essentially rigid vinyl chloride polymer such as vinyl chloride homopolymers and interpolymers of vinyl chloride with interpolymerizable monomers such as vinyl esters of organic acids containing 1 to 18 carbon atoms, e.g., vinyl acetate, vinyl stearate, and so forth; vinylidene chloride; symmetrical dichloroethylene; acrylonitrile; methacrylonitrile; alkyl acrylate esters in which the alkyl group contains 1 to 8 carbon atoms, e.g., methyl acrylate and butyl acrylate; the corresponding alkyl methacrylate esters; dialkyl esters of dibasic organic acids in which the alkyl groups contain 1–8 carbon atoms, e.g., dibutyl fumarate, diethyl maleate, and so forth. In general, where vinyl chloride interpolymers are employed, they should contain at least about 95 weight percent of vinyl chloride.

The chlorinated olefin polymers used in the present invention can be readily obtained by practice of a chlorination procedure which comprehends the suspension chlorination in an inert medium of finely divided essentially linear polyethylene and interpolymers containing at least about 90 mole percent ethylene with the remainder being one or more ethylenically unsaturated comonomers, to a desired total of combined chlorine content wherein such polymer is first chlorinated at a temperature below its agglomeration temperature for a period sufficient to provide a chlorine content of from about 2 to 23 percent chlorine, based on the total weight of the polymer; followed by the sequential suspension chlorination of such polymer, in a particulate form, at a temperature above its agglomeration temperature but at least about 2° C. below its crystalline melting point for a period sufficient to provide a combined chlorine content of up to about 48 weight percent based on the total weight of the polymer and wherein at least about 2 percent chlorine is added during the sequential chlorination step.

Preferably, the polyolefinic materials to be chlorinated are those distinct species and varieties of essentially linear and unbranched highly porous polymers containing at least about 90 mole percent ethylene in the polymer molecule with any remainder being one or more ethylenically unsaturated comonomers; such polymers being prepared under the influence of catalyst systems comprising admixtures of strong reducing agents such as triethyl aluminum and compounds of groups IV-B, V-B and VI-B metals of the Periodic System, such as titanium tetrachloride and the like, and having a molecular weight of at least about 20,000 and preferably between about 20,000 and 300,000.

Exemplary of useful ethylenically unsaturated comonomers are the nonaromatic hydrocarbon olefins having 3 or more carbon atoms such as propylene, butene-1 and 1,7-octadiene and the like; cycloaliphatic olefins such as cyclopentene and 1,5-cyclooctadiene and the like; substituted olefins such as acrylic acid and its esters; conjugated diolefins such as butadiene and the like, and the alkenyl aromatic compounds such as styrene and its derivatives, among many other polymerizable materials known to the art.

It has also been found to be of special advantage to carry out the chlorination in the presence of inert substances of inorganic or organic chemical nature which are such that they have an affinity for adsorption onto the surfaces of the polyolefin during chlorination so that they may function as barriers to inhibit particle agglomeration. Exemplary of useful inert materials are carbon black and titanium dioxide and the like. Such materials may be employed for the desired purpose without significantly detracting from the highly desirable elastomeric properties of the polymer.

Although the chlorinated olefin polymers used for the purposes of the present invention are preferably prepared in aqueous suspension by the procedure as herein described, it is to be understood that such materials may be prepared by other means, e.g., by solution chlorination techniques, providing the so-formed polymers are of the necessary molecular weight, chlorine content and crystallinity.

The chlorinated olefin polymer described herein must be present in amounts of at least about 0.25 part by weight per 100 parts of vinyl chloride polymer and may be employed in amounts up to about 35 parts per 100 parts of vinyl chloride polymer without significant reduction in processability and/or clarity or surface smoothness of the resulting fabricated article, providing such chlorinated olefin polymer is used in combination with the required amounts and types of polyethylene. Further, utilization of the amounts and types of chlorinated olefin polymers specified herein is necessary to obtain the required resistance to heat during fabrication and to render the polyethylene component sufficiently compatible with the vinyl chloride polymer during fabrication of the described polymeric compositions.

The polyethylenes employed in the present invention are selected from any homopolymer of ethylene having an average molecular weight of between about 1,500 and 15,000 as determined by procedures such as described by Sperati, et al Journal of American Chemical Society 75 6129 (1953). Utilization of polyethylenes having a molecular weight of greater than about 15,000, have been found to be generally ineffective in producing shaped articles of sufficient clarity and smoothness. Further, it has been found that such polyethylenes must be present, in combination with the required amounts and types of chlorinated olefin polymers, in an amount of between about 0.2 and 0.7 part by weight per 100 parts of vinyl chloride polymer to achieve necessary ease of processability and clarity and smoothness of the shaped articles. Still further, it has been found that utilization of such polyethylenes in any amount, in the absence of the required chlorinated olefin polymer component, fails to provide for necessary clarity and smoothness of shaped articles prepared from such compositions.

It has also been found that the compositions of the present invention may additionally contain one or more resinous impact strength modifiers, which are compatible with the vinyl chloride polymer, without adverse effect upon the unexpectedly enhanced processability, clarity and surface smoothness provided by the compositions as described herein. In this regard, it is generally preferred to use such modifiers in an amount of from about 5 and 25 parts per 100 parts of the vinyl chloride polymer constituent of the composition.

Although the present invention contemplates the utilization of any conventionally employed resinous impact strength modifier which is sufficiently compatible with the vinyl chloride polymer in the prescribed amounts, particularly good results are obtained by the addition of from about 5 to 25 parts, and preferably between about 10 and 22 parts by weight per 100 parts of the vinyl chloride polymer of one or more graft copolymers of styrene-acrylonitrile or styrene-isobutylene-acrylonitrile mixtures upon butadiene, as disclosed and claimed in the U.S. Pat. No. 2,802,809, issued Aug. 13, 1957. Another useful impact strength modifier is the thermoplastic acrylic polymers available commercially as "Acryloid KM-227" when used in the above preferred amounts. Compositions containing such impact modifying materials in the stated amounts have been found to be particularly useful for preparing extrusion fabricated articles such as extrusion-blow molded bottles and the like. It is to be understood, however, that these and many other conventionally employed impact strength modifiers may be used in widely varying amounts, depending upon the properties desired, providing such materials remain compatible with the vinylchloride polymer compositions described herein.

It is further to be pointed out that other ingredients such as pigments and stabilizers may also be incorporated into the compositions of the present invention. Exemplary of particularly useful stabilizers are the sulfur containing organo tin compounds including the alkyl tin mercaptides, among many others known in the art. Such stabilizers are preferably used in amounts sufficient to provide between about 1 and 5 parts by weight per 100 parts of the vinyl chloride polymer constituent of the present invention.

The vinyl chloride polymer compositions of the invention may be formulated and prepared in any conventional manner, as by dry blending the polymeric ingredients and milling them at elevated temperatures of between about 150° and 200° C. with conventionally employed compounding and milling rolls and the like apparatus, and are particularly useful in the preparation of molten or extruded articles of the rigid, chemically resistant type such as pipes and tubing and the like, and are especially useful for preparing extrusion blow-molded bottles of high clarity and surface smoothness.

The following examples wherein all parts and percentages are to be taken by weight, illustrate the present invention but are not to be construed as limiting its scope.

Example 1

In each of a series of experiments the following specified ingredients were individually admixed in a Waring blendor and extruded from a two-stage, one-inch extruder operating about 44 rpm while employing a first stage cylinder temperature of about 350° F. and a second stage cylinder temperature of about 410° F. Individual rod-shaped test samples were obtained by extrusion through a single 0.275 × 1.25 inch cylindrical die.

| | Parts by Weight |
|---|---|
| Polyvinyl Chloride | 100 |
| (having an inherent visc. of between 0.81 and 0.89 as per ASTM Test D1243 and a K-value of between 62.5 and 65.5 by Fikentscher method). | |
| Stabilizer | 0.25 to 5.0 |
| (Alkyl tin mercaptide) | |
| Polyethylene | 0 to 1.8 |
| (Avg. mol. wt. between 1,500 and 10,000) | |
| Chlorinated Polyethylene | 0 to 1.8 |
| (35 wt. % chlorine) or chlorinated interpolymer of 94 wt. % ethylene and 6 wt. % butene (36 wt. % chlorine) | |

The chlorinated olefin polymers used in this example were prepared as follows:
1. forming an aqueous slurry comprising 4,000 grams water and 200 grams of a polyethylene or the designated copolymer of ethylene and butene, having an essentially linear and unbranched molecular structure containing less than about 1 methyl group per 100 methylene units in its molecule, a density of about 0.96, an average molecular weight of about 67,000, and which had been prepared using a catalyst composed of triisobutyl aluminum and titanium tetrachloride;
2. charging such aqueous slurry to a 1½ gallon autoclave with 8 grams of calcium chloride and about 0.5 cc of a 70 percent solution of ditertiary butyl peroxide in butanol;
3. chlorinating the charge, as a first suspension chlorination step, under about 30 psi (gauge) of chlorine pressure at a temperature of about 90° C. until a chlorine content of about 20 percent was obtained, and
4. further chlorinating the charge in a second suspension chlorination step, at a temperature of about 126° C. until a total chlorine content of about 35 percent was obtained. The chlorination products were then isolated by filtration, washed free of residual hydrochloric acid and dried. Such products were characterized by having a relative crystallinity of less than about 10 percent, tensile strength of about 1,400 psi and a 100 percent modulus of about 200 psi.

The following Table I illustrates the appearance of each extrudate sample and its processability characteristics as defined by the current requirement (amps) for extrusion and the extrusion rate (grams/min).

The data of Series I illustrate the unexpected clarity and smoothness of the extrudate and the accompanying ease in processability obtained by using a mixture of the chlorinated olefin polymer and the polyethylene in the vinyl chloride polymer.

The data of Series II illustrate that polyethylenes having molecular weights between 1,500 and 10,000 may be effectively used in concentrations ranging from 0.2 to 0.6 part per 100 parts of the vinyl chloride polymer when in the presence of the designated chlorinated olefin polymer.

The data of Series III illustrate that at least about 0.25 part by weight of chlorinated olefin polymer per 100 parts of vinyl chloride polymer is required to obtain significantly improved clarity and smoothness of the extrudate.

TABLE I

| Run No. | Composition (parts by wt) CPE | Composition (parts by wt) PE | PE Mol-wt. | Processability Appearance of Extrudate | Processability Amps required | Processability Extrusion Rate (gms/min) |
|---|---|---|---|---|---|---|
| Series I: Effect of combination of CPE and PE | | | | | | |
| 1 | None | None | – | Rough-opaque | 11.8 | 56 |
| 2 | 1.8 | None | – | do. | 10 | 62 |
| 3 | None | 1.8 | 2,000 | do. | 9.2 | Surged |
| 4 | None | 1.8 | 10,000 | do. | 9 | Surged |
| 5 | 1.5 | 0.3 | 2,000 | Smooth-clear | 10 | 65.2 |
| 6 (ethylene-butene copolymer) | 1.5 | 0.3 | 2,000 | do. | 10 | 62 |
| Series II: Varying PE Concentration and molecular weight | | | | | | |
| 7 | 1.5 | 0.2 | 1,500 | do. | 9.5 | 48 |
| 8 | 1.5 | 0.2 | 4,000 | do. | 9.5 | 48 |
| 9 | 1.5 | 0.2 | 7,000 | do. | 9.5 | 48 |
| 10 | 1.5 | 0.2 | 10,000 | do. | 9.7 | 48 |
| Series III: Varying CPE Concentration | | | | | | |
| 11 | 0.25 | 0.3 | 2,000 | Slight roughness & opaqueness | 9.5 | 42 |
| 12 | 0.4 | 0.3 | 2,000 | Smooth-clear | 9.5 | 42 |
| 13 | 0.5 | 0.3 | 2,000 | do. | 9.7 | 44 |
| 14 | 1.0 | 0.3 | 2,000 | do. | 9.8 | 46 |

Example 2

In each of a series of additional experiments the following ingredients were formulated and extruded into test samples as described in Example 1:

|  | Parts by Weight |
|---|---|
| Polyvinyl Chloride (as per Example 1) | 100 |
| Stabilizer (as per Example 1) | 0.25 to 5 |
| Polyethylene (avg. molecular wt. between 2,000 and 35,000) | 0 to 2 |
| Chlorinated Polyethylene (36 to 48% chlorine prepared as described in Example 1 where any additional chlorine was added in the second suspension chlorination step) | 0 to 35 |
| Impact Strength Modifier (graft copolymer of styrene-acrylonitrile upon butadiene) | 20 |

The following Table II illustrates the composition and appearance of each extrudate sample and its processability characteristics.

The data of Series IV, V and VI, illustrate that the presence of the graft copolymer impact modifier in the vinyl chloride polymer formulation does not adversely affect the unexpected and desirable enhancement of extrudate smoothness and ease of processability obtained by utilization of the prescribed mixtures of chlorinated olefin polymer and polyethylene. Such data additionally shows (1) that the effective maximum concentration of the polyethylene is about 0.7 part per 100 parts of vinyl chloride polymer (Run Nos. 22 and 23) and (2) that the chlorinated olefin polymer may be effectively used in an amount up to about 35 parts per 100 parts of vinyl chloride polymer while in combination with the polyethylene (Run Nos. 29 and 30).

Example 3

In each of an additional series of experiments the following ingredients were formulated and extruded into test samples as described in Example 1.

|  | Parts by Weight |
|---|---|
| Polyvinyl Chloride (as per Example 1) | 100 |
| Stabilizer (as per Example 1) | 0.25 to 5 |
| Chlorinated Polyethylene (36% cl – as per Example 1) | 0 to 1 |
| Conventional vinyl chloride polymer lubricant | 0.3 to 2 |
| Impact Strength Modifier (graft copolymer of styrene-acrylonitrile on butadiene) | 0 to 20 |

TABLE II

| | Composition | | | Processability | | |
|---|---|---|---|---|---|---|
| Run No. | CPE Amt. | PE Amt. | Mol-wt. | Appearance of Extrudate | Amps Required | Extrusion Rate (gms/min) |
| Series IV: Effect of combination of CPE and PE | | | | | | |
| 15 | None | None | | Rough | 11.5 | 56 |
| 16 | None | 2.0 | (2000) | Would not extrude | – | – |
| 17 | 2.0 (36%cl) | None | | Rough | 11.2 | 59.7 |
| 18 | 1.5 (36%cl) | 0.5 | (2000) | Smooth | 10.2 | 68 |
| Series V: Varying PE concentration and molecular weight | | | | | | |
| 19 | 1.5 (36%cl) | 0.6 | (2000) | Smooth | 10 | 52 |
| 20 | do. | 0.65 | do. | do. | 9.9 | 52 |
| 21 | do. | 0.7 | do. | do. | 10 | 52 |
| 22 | do. | 0.75 | do. | Slightly lumpy | 9.6 | 44 |
| 23 | do. | 1.0 | (35,000) | Rough | 10 | 28 |
| Series VI: Varying CPE concentration | | | | | | |
| 24 | 0.1 (36%cl) | 0.5 | (2000) | Rough | 9.6 | 46 |
| 25 | 0.2 (36%cl) | do. | do. | Slightly lumpy | 9.4 | 42 |
| 26 | 0.25 | do. | do. | Smooth | 9.6 | 56 |
| 27 | 0.5 | do. | do. | do. | 9.8 | 52 |
| 28 | 1.0 | do. | do. | do. | 10 | 52 |
| 29 | 35 (48%cl) | 0.4 | do. | Slightly lumpy | 9.5 | 56 |
| 30 | 35 | None | do. | Rough | 10.5 | 60 |

Table III illustrates the composition and appearance of each extrudate sample and its processing characteristics.

TABLE III

| | Composition | | | Processability | | |
|---|---|---|---|---|---|---|
| Run No. | CPE (pts by wt) | Impact Strength Modifier (pts by wt) | Lubricant (pts by wt) | Appear. of Extrudate | Amps Req'd | Extrusion Rate (grams/min) |
| 31 | None | 20 | 2 pts Calcium Stearate | Rough | 11 | – |
| 32 | None | 20 | 2 pts Stearic Acid | Rough | 10.75 | – |
| 33 | None | 20 | 2 pts Mineral Oil | Rough | 11.15 | – |
| 34 | 1.0 | 0 | 0.5 pts Mineral Oil | Rough | 9.6 | 40 |
| 35 | 1.0 | 0 | 0.3 pts Mineral Oil | Rough | 10 | 52 |

The above data illustrate that substitution of conventional vinyl chloride lubricants and processing aids for the polyethylene constituents of the present invention, fails to provide the desirable smoothness of extrudate surface.

Example 4

In each of the following additional series of experiments, the extrudate samples were formulated and extruded as described in Example 1.

| | Parts by Weight |
|---|---|
| Polyvinyl Chloride (as per Example 1) | 100 |
| Stabilizer (as per Example 1) | 0.25 |
| Chlorinated Polyethylene (36% – as per Example 1) | 1.5 |
| Polyethylene (2,000 to 15,000 M.W.) | 0.4 to 0.5 |
| Impact Strength Modifier (as designated) | 10 |

TABLE IV

| | Composition | | | | Processability | | |
|---|---|---|---|---|---|---|---|
| Run No. | CPE Amt. | PE Amt. | M.W. | Impact Strength Modifier | Extrudate Appear. | Amps Req'd | Extrusion Rate (grams/min) |
| 36 | 1.5 | 0.4 | 2000 | graft copolymer of styrene-acrylonitrile on butadiene (Blendex 401) | Smooth | 9.8 | 56 |
| 37 | 1.5 | 0.4 | 2000 | graft copolymer of styrene-methyl methacrylate on butadiene (Kane ACE B-12) | Smooth | 9.9 | 58 |
| 38 | 1.5 | 0.5 | 15,000 | do. | Smooth | 9.6 | 42 |
| 39 | 1.5 | 0.4 | 2000 | Acrylate | Smooth | 9.6 | 52 |

The above data illustrate that conventionally used impact strength modifiers of varying types may be used without adverse effect upon processability and extrudate smoothness.

Example 5

In each of an additional series of experiments the following ingredients were formulated and extruded into test samples as described in Example 1.

| | Parts by Weight |
|---|---|
| Polyvinyl Chloride (as per Example 1) | 100 |
| Stabilizer Alkyl tin mercaptide | 0–2 |
| Chlorinated Polyethylene (36% cl – as per Example 1) | 1.5 |
| Impact Strength Modifier (Methyl methacrylate - styrene-butadiene interpolymer) | 10 |
| Polyethylene (2,000 mol. wt.) | 0.3 |

The following Table V illustrates the composition and appearance of each extrudate sample:

TABLE V

| Run No. | CPE Amt. | PE Amt. | Impact Modifier Amt. | Stabilizer Amt. | Appearance of Extrudate |
|---|---|---|---|---|---|
| 40 | 1.5 | 0.3 | 10 | 2 | Smooth |
| 41 | 1.5 | 0.3 | 10 | None | Smooth |

The above data illustrate that the extrudate smoothness is not dependent upon the presence of the stabilizer.

What is claimed is:

1. A rigid easily processable thermoplastic composition comprising an intimate mixture of:
   a. polyvinyl chloride
   b. between about 1.5 and 35 parts by weight per 100 parts of said polyvinyl chloride of a chlorinated polyethylene prepared by the chlorination of an olefin polymer having an essentially linear structure containing less than about 1 methyl group per 100 methylene units in its molecule and having a density of about 0.96 and an average molecular weight of about 67,000, said chlorinated polyethylene containing from about 35 to 48 weight percent of chemically combined chlorine and having a crystallinity of less than about 10 percent and
   c. between about 0.2 and 0.5 part per 100 parts of said polyvinyl chloride of a polyethylene having a molecular weight of between about 1,500 and 15,000.

2. The composition of claim 1 containing in addition thereto and in combination therewith up to about 25 parts by weight per 100 parts of said polyvinyl chloride of a resinous impact strength modifier which is compatible with said polyvinyl chloride.

3. A rigid easily processable thermoplastic shaped article having smooth surfaces prepared from the composition of claim 1.

* * * * *